United States Patent
Baier et al.

(10) Patent No.: US 10,671,463 B2
(45) Date of Patent: Jun. 2, 2020

(54) RECONFIGURABLE EMBEDDED RULES ENGINE FOR INTERNET OF THINGS (IOT) DEVICES

(71) Applicant: JM Driver LLC, San Diego, CA (US)

(72) Inventors: Reinhard Oswald Baier, Berlin (DE); Teemu Alpo Samuli Moilanen, Tampere (FI)

(73) Assignee: JM Driver LLC, San Diego, CA (US)

( * ) Notice: Subject to any disclaimer, the term of this patent is extended or adjusted under 35 U.S.C. 154(b) by 0 days.

(21) Appl. No.: 16/240,241

(22) Filed: Jan. 4, 2019

(65) Prior Publication Data

US 2019/0213064 A1  Jul. 11, 2019

Related U.S. Application Data

(60) Provisional application No. 62/614,233, filed on Jan. 5, 2018.

(51) Int. Cl.

| | |
|---|---|
| *G06F 9/54* | (2006.01) |
| *G06F 9/445* | (2018.01) |
| *H04L 12/28* | (2006.01) |
| *G06F 8/41* | (2018.01) |
| *G06F 8/656* | (2018.01) |

(52) U.S. Cl.
CPC .......... *G06F 9/547* (2013.01); *G06F 9/44505* (2013.01); *G06F 9/44557* (2013.01); *H04L 12/2814* (2013.01); *G06F 8/4434* (2013.01); *G06F 8/656* (2018.02)

(58) Field of Classification Search
CPC ....................................................... G06F 9/541
USPC ........................................................ 719/328
See application file for complete search history.

(56) References Cited

U.S. PATENT DOCUMENTS

2016/0291552 A1* 10/2016 Pal ........................ G05B 13/026
2019/0278809 A1*  9/2019 El Kaed ............ G06F 16/90332

OTHER PUBLICATIONS

Charbel El Kaed, SRE: Semantic Rules Engine for the Industrial Internet-Of-Things Gateways, Oct. 2017, IEEE, pp. 1-9 (Year: 2017).*

(Continued)

*Primary Examiner* — Andy Ho
(74) *Attorney, Agent, or Firm* — Fish & Richardson P.C.

(57) ABSTRACT

Systems and apparatus including consumer electronic devices, including Internet of Things (IoT) connectivity and a reconfigurable embedded rules engine, include: a code base that has been minimized to reduce a memory footprint of the code base in a memory device; and wherein the code base performs operations comprising effecting cross-platform network communications functionality using a computer communications network interface, providing access to the cross-platform network communications functionality through a communications application programming interface (API), triggering network communications, using the communications API, in accordance with encoded device-operation rules comprising at least one encoded communication triggering rule, allowing changes to the encoded device-operation rules through a rules updating API, and checking whether the changes to the encoded device-operation rules received through the rules updating API comply with at least one of the processing resource constraints associated with a hardware processor and a memory device.

18 Claims, 4 Drawing Sheets

(56) References Cited

OTHER PUBLICATIONS

Kaed et al., "SRE: Semantic Rules Engine for the Industrial Internet-Of-Things Gateways", IEEE Transactions on Industrial Informatics, Jan. 1, 2017, XP055441478, 9 pages.

Vogler et al., "Leonore—Large-Scale Provisioning of Resource-Constrained IoT Deployments", 2015 IEEE Symposium on Service-Oriented System Engineering, IEEE, Mar. 30, 2015, pp. 78-87.

International Application No. PCT/US2019/012290, Notification of Transmittal of the International Search Report and the Written Opinion of the International Searching Authority, dated Mar. 21, 2019, 16 pages.

International Application No. PCT/US2019/012290, Notification of Transmittal of the International Preliminary Report on Patentability, dated Mar. 13, 2020, 32 pages.

\* cited by examiner

RECONFIGURABLE EMBEDDED RULES ENGINE FOR INTERNET OF THINGS (IOT) DEVICES

CROSS-REFERENCE TO RELATED APPLICATIONS

This application claims the benefit under 35 U.S.C. § 119(e) of U.S. Patent Application No. 62/614,233, entitled "RECONFIGURABLE EMBEDDED RULES ENGINE FOR INTERNET OF THINGS (IOT) DEVICES", filed Jan. 5, 2018, which is incorporated herein by reference in its entirety.

BACKGROUND

The present disclosure relates to resource constrained electronic devices, or consumer electronic devices, including Internet of Things (IoT) connectivity and a reconfigurable embedded rules engine.

Wireless communication, particularly wireless local area network (WLAN) technology, has become ubiquitous in the mobile computing environment. Some existing wireless networking standards, for example, WiFi protocol IEEE (Institute of Electrical and Electronics Engineers) 802.11 can be used to provide close-proximity wireless connectivity between wireless devices. Additionally, newer wireless networking technologies, such as 802.11ah, have been developed that are capable of operating at longer ranges and having comparatively lower device power consumption than some existing wireless systems. These long-range, low power (LRLP) wireless technologies are usable to extend the communication range that is achieved with some legacy 802.11 wireless technologies, such as WiFi and Bluetooth.

An example of such an environment is the Internet of Things (IoT), which extends networking capabilities to wide-ranging types of applications. Through the IoT framework, virtually any type of physical device, ranging from vehicles to thermostats, are capable of Internet based communication, providing information about the device itself or its surroundings, and/or may be controlled remotely via client devices over the Internet. In existing implementations, no universal communication language or protocol exist for current IoT implementations. Additionally, such a wide range of devices can have disparate computing frameworks from different company platforms, which limits the communication capabilities across these different platforms. These and other challenges related to interoperability, uniformity, and extending functionality for resource constrained devices can exist in some current IoT environments.

SUMMARY

The present disclosure relates to resource constrained electronic devices, or consumer electronic devices, including Internet of Things (IoT) connectivity and a reconfigurable embedded rules engine.

In general, one or more aspects of the subject matter described in this specification can be embodied in one or more systems that include: a computer program product, encoded on a computer-readable medium, operable to cause a hardware processor to perform operations including: loading program code instructions into a memory device to further cause the hardware processor to perform operations specified by the program code instructions, wherein the hardware processor and the memory device have associated processing resource constraints; and wherein the program code instructions include a code base that has been minimized to reduce a memory footprint of the code base in the memory device; and wherein the code base performs operations including effecting cross-platform in network communications functionality using a computer communications network interface, providing access to the cross-platform network communications functionality through a communications application programming interface (API), triggering network communications, using the communications API, in accordance with encoded device-operation rules including at least one encoded communication triggering rule, allowing changes to the encoded device-operation rules through a rules updating API, and checking whether the changes to the encoded device-operation rules received through the rules updating API comply with at least one of the processing resource constraints associated with the hardware processor and the memory device.

In general, one or more aspects of the subject matter described in this specification can be embodied in one or more consumer electronic devices including: a computer communications network interface; a hardware processor and a memory device coupled with the computer communications network interface, wherein the hardware processor and the memory device have associated processing resource constraints; and wherein the memory device is configured to load program code instructions to cause the hardware processor to perform operations specified by the program code instructions; and wherein the program code instructions include a code base that has been minimized to reduce a memory footprint of the code base in the memory device; and wherein the code base implements a program architecture including a communications module that implements cross-platform network communications functionality using the computer communications network interface, the communications module including a communications application programming interface (API) to provide access to the cross-platform network communications functionality, and a device-operation rules engine that triggers network communications, using the communications API of the communications module, in accordance with encoded device-operation rules that have been encoded in a simple binary format and including at least one encoded communication triggering rule, the device-operation rules engine including a rules updating API that allows changes to the encoded device-operation rules, and wherein the device-operation rules engine is programmed to check whether the changes to the encoded device-operation rules received through the rules updating API comply with at least one of the processing resource constraints associated with the hardware processor and the memory device.

Particular embodiments of the subject matter described in this specification can be implemented to realize one or more of the following advantages. The disclosed system implements an embedded software solution that supports standard-compliant and protocol agnostic communications. Consequently, the disclosed system and techniques allow for interoperability and cross-platform network communications for consumer electronic devices with IoT connectivity. Also, the system implements embedded software that enables a consumer electronic device to function as a secure single control point for multiple consumer electronic devices, including resource constrained devices having disparate computing frameworks.

The system and techniques described provide a small-footprint modular connectivity framework for resource-constrained IoT systems. The system also implements a user-configurable rules engine, which is designed for memory optimization and processor efficiency. The system includes software that has been optimized for embedding into resource constrained devices (e.g., minimal memory, low processing power, lower central process unit (CPU) clock speeds, small or no operating system), while supporting customization for various platforms. Moreover, the disclosed system is designed to optimally tradeoff providing a flexible integration framework, while satisfying stringent resource constraint requirements. The system can implement a web-based user interface that can be accessed by any device local to the network and including software capable of employing the API, such as a web browser or mobile application. Thus, the user-configurable engine (and thus individual consumer electronic devices) can be managed by one or more other devices.

The above and other aspects and embodiments are described in greater detail in the drawings, the description and the claims.

DESCRIPTION OF DRAWINGS

Like reference numbers and designations in the various drawings indicate like elements.

DETAILED DESCRIPTION

Various embodiments are shown and described. Other embodiments may be used in addition to or instead of the embodiments disclosed. Details which may be apparent or unnecessary may be omitted to save space or for a more effective presentation. Conversely, some embodiments may be practiced without all of the details which are disclosed.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Figure 1:
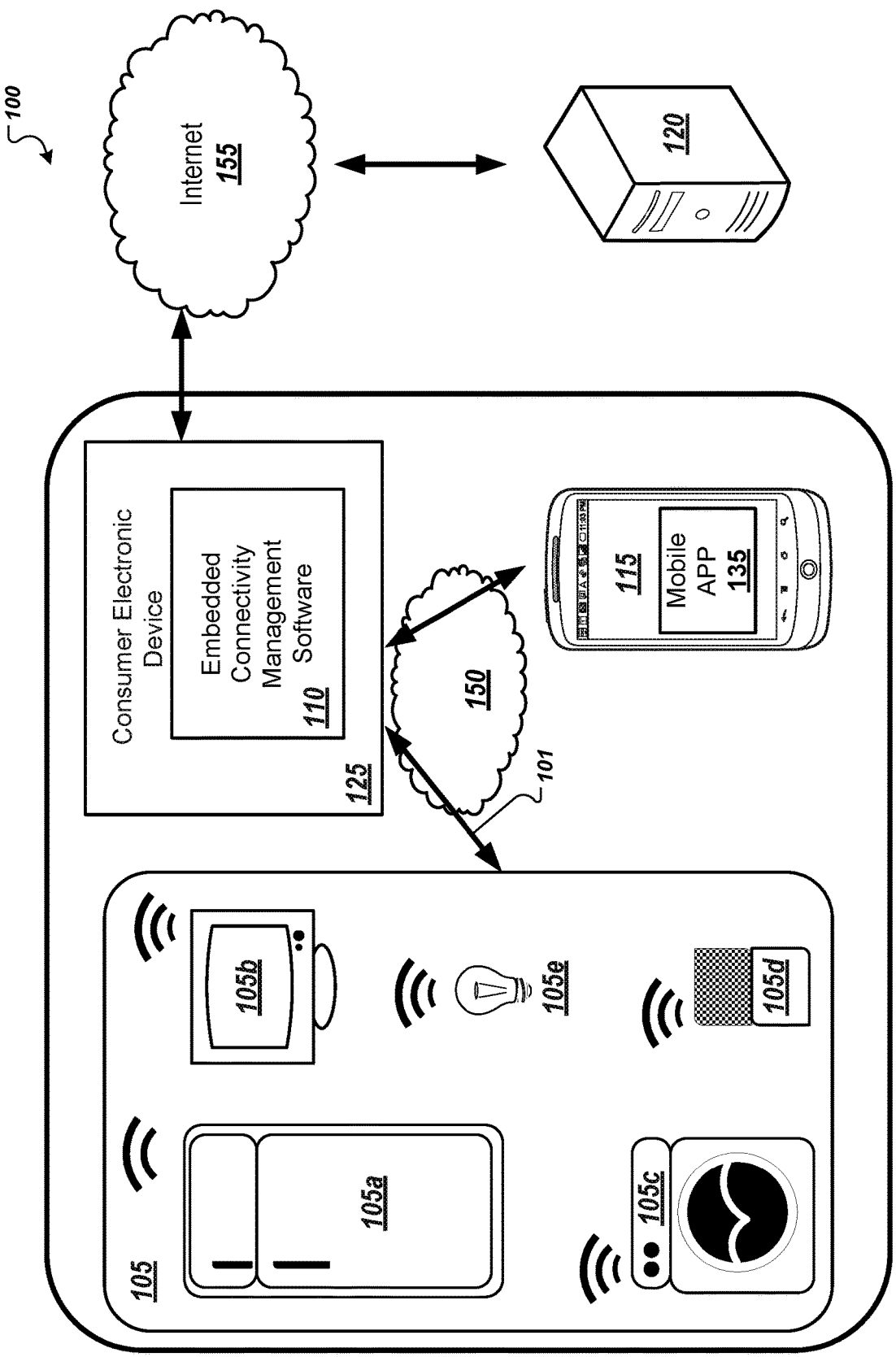
FIG. 1 shows an example of a wireless communication system including a consumer electronic device for implementing Internet of Things (IoT) connectivity management and a reconfigurable embedded rules engine.

FIG. 1 shows an example of a communication system 100 including a consumer electronic device 105 for implementing Internet of Things (IoT) connectivity management and a reconfigurable embedded rules engine. In FIG. 1, the system 100 includes a communication network 150. As an example, communication network 150 can be employed to provide wireless connectivity for stationary, portable, and mobile electronic devices within accessible range to establish wireless communication links 101, or channels, supported by the network 150. The wireless communication network 150 includes components that interact with one another in order to provide an over-the-air (OTA) interface between various consumer electronic devices having IoT connectivity, also referred to as IoT devices. IoT connectivity generally refers to communicative connections between identifiable electronic devices within an Internet infrastructure, in accordance with IoT technology standards, such as the Open Connectivity Foundation (OCF) standard.

In the illustrated example, network 150 is configured as a communication network located within a certain vicinity, such as a home of a user, and providing wireless connections amongst various consumer electronic devices. Accordingly, FIG. 1 shows network 150 in a configuration that is commonly referred to as a smart home environment. Many consumer electronic devices intended for home use, such as household appliances, are physically small devices that are designed to support low power, and low-complexity computing. In some embodiments, the plurality of IoT devices 105 are devices using long range, low-power technologies to extend battery life to operate for greater lengths of time (e.g., years). In this case, communication links 101 can be implemented using a low-power wireless communication technology such as Bluetooth Low Energy (LE), and IoT devices 105 can include Bluetooth LE antennas and protocol stacks.

For example, the plurality of IoT devices 105 include various consumer electronic devices suited for in-home use, such as a refrigerator 105$a$, television 105$b$, washing machine 105$c$, micro-speaker 105$d$, and a light 105$e$. Consequently, some of the consumer electronic devices included in the plurality of IoT devices 105 can have resource-limitations that restrict the processing capabilities and configurability of these devices. Resource-limitations can include minimal memory, low central process unit (CPU) processing power, low CPU clock speed, and low-level software (e.g., no operating system). Moreover, each of the devices in the plurality of IoT devices 105 can operate using a different platform corresponding to a particular manufacturer (or service provider) associated with that device. As a result, the plurality of IoT devices 105 can be associated with a lack of uniformity in regards to communication (e.g., different communication protocol), due to the disparate platforms. Consumer electronic device 125, including embedded connectivity management software 110, implements a solution to various challenges, such as multiple platforms, resource-constrained restrictions, and other factors that can be associated with providing a centralized command and control for the IoT devices 105.

In some cases, one or more of the plurality of IoT devices 105 are equipped with sensors to collect information, such as data regarding the device itself or the surrounding environment. In accordance with IoT connectivity, the devices can communicate the collected information to mobile device 115 or remote computer 120, via the consumer electronic device 125. Some of the IoT devices 105 can perform a specified function in response to control commands sent through the consumer electronic device 105. Various specific examples of information collected by the IoT devices 105 and control commands are provided below.

Additionally, FIG. 1 illustrates that consumer electronic device 125 is configured to establish a connection to a network that is external to the local vicinity, such as a wide area network (WAN) shown as Internet 155. The consumer electronic device 125 can include multiple hardware and/or software elements used to support Internet connections, for instance a network interface to establish a connection to the Internet 155. As an example, the network interface can be a cellular transceiver to connect to Internet 155 via a cellular service (e.g., Mobile WiMAX, LTE, 5G, etc.). Alternatively, or in addition, the consumer electronic device 125 can include a network interface that is a wireless transceiver to establish a WiFi connection (e.g., through an access point) to the Internet 155. In some cases, the consumer electronic device 125 can also include a network interface that establishes a wired network connection (e.g., ETHERNET, USB, or FIREWIRE), for example via a cable modem or digital subscriber line (DSL).

FIG. 1 shows a mobile device 115 configured to communicate with consumer electronic device 125. The mobile device 115 can communicate with the consumer electronic device 125, and be employed by a user to interactively access and/or manipulate functions provided by the embedded connectivity management software 110. As an example, the mobile device 115 with an installed app 135 (or a browser-based interface) can present a user interface (UI) that can be used to associate the consumer electronic device 125 with a particular user, and further present a comprehensive UI associated with each of the IoT devices 105 communicatively hubbed to the consumer electronic device 105. In another example, a user can employ the mobile device 115 to create new user-defined communication rules for a particular IoT device, which are then applied to a rules engine within the embedded connectivity management software 110. Although the embedded connectivity management software 110 is illustrated as being installed on consumer electronic device 125, it should be appreciated that the software can be embedded in one or more of the plurality of IoT devices 105. As a result, IoT devices 105 with the embedded connectivity software 110 installed thereon, are enabled to actively participate in the cross-platform communication within the framework.

Also, the mobile device 115 can execute a mobile application (e.g., app) allowing a user to perform various functions (e.g., access, configure, control) with respect to the connected IoT devices 105 based on its interaction with the consumer electronic device 125. Accordingly, the mobile device 115 can act as a controller for the multiple IoT devices 105, and receive input from a user via the app so as to control a selected device, or group of devices. In some implementations, the embedded connectivity management software 110 provides an API allowing a user, such a software developer, to design a mobile app to be executed by mobile device 115, which is customized to manage each of the plurality of IoT devices 105 through the single mobile app (e.g., rather than using multiple apps to manage multiple devices). It should be appreciated that alternatively, or in addition to the mobile device 115, a computer device of another form (e.g., desktop computer, laptop computer, tablet) can be used to implement the aforementioned techniques by executing a software application.

Moreover, the mobile device 115 can access a remote computer 120, via Internet 155. Remote computer 120 can be associated with the supplier of the embedded connectivity management software 110, for instance an IoT service provider. The service provider can use the remote computer 120 as part of a distributed platform along with the embedded software that allows additional services to be distributed to multiple users, via the Internet 155 (e.g., cloud service). The remote computer 120 can also incorporate and integrate these additional services for the user, where the additional services can extend, supplement, or are related to the capabilities of the IoT devices 105, the consumer electronic device 125, and the embedded connectivity management software 110. For example, a user of the mobile device 115 can employ the Internet 155 to access additional services (e.g., cloud services) that provide to the user the ability to remotely manage IoT devices 105 when away from the home. In some cases, mobile device 115 can execute an app designed by the operator of the remote computer 120, such as the IoT service provider, to provide further IoT functionality to users.

As shown, the example system 100 includes a plurality of IoT devices 105 communicatively coupled over local communication channels 101 to the consumer electronic device 125. Consumer electronic device 125 is illustrated as having embedded connectivity management software 110 installed thereon. The embedded connectivity management software 110 is configured to enable the consumer electronic device 125 to act as an IoT hub, supporting a a protocol agnostic, cross-platform communication amongst the plurality of IoT devices 105. The embedded connectivity management software 110 can be based on a IoT connectivity standard, such as the OCF standard, allowing centralized communication and management of the wide range of consumer devices that can be included amongst the group the IoT devices 105. For instance, a first device amongst the IoT devices 105 can be configured to use the Zigbee protocol, another device can be configured to use the Z-Wave protocol, and yet another device can be configured to use the Thread protocol. Due to the functionality provided by installing the embedded connectivity management software 110, consumer electronic device 125 is capable of discovering, and managing, each of these devices. In some implementations, the system 100 includes an IoTivity bridge that communicates with the consumer electronic device 125, which supports interoperability with devices using protocols other than OCF. Examples of bridges that can be implemented include Open Network Video Interface (ONVIF) bridge and Hue bridge. As discussed in greater in reference to FIG. 2, the embedded connectivity management software 110 includes a rules engine as middleware, allowing rules to be defined and executed across all managed devices, regardless of protocol. For example, embedded connectivity management software 110 can be used to define (and execute) a rule that receives a trigger from a sensor configured for Z-Wave protocol, then turns on a light configured for Zigbee protocol, starts recording video from a camera configured for ONVIF, and sounds an alarm on speakers configured for OCF.

Additionally, the embedded connectivity management software 110 supports interoperability with the plurality of IoT devices 105 using the consumer electronic device 125 as a centralized hub (and using a companion mobile app or web browser). The embedded connectivity management software 110 can be based, at least in part, on a particular implementation of the OCF standard that can further extend capabilities of the OCF stack, such as the IoTivity Constrained implementation. It should be appreciated that IoTivity Constrained is used herein for purposes of discussion, and other open source implementations of the OCF standard for IoT devices designed for resource constrained environments can be used as deemed necessary and/or appropriate. In cases when the embedded connectivity management software 110 utilizes an open source implementation of the OCF standard, the embedded software enables OCF compliance for the various resource constrained devices included in the IoT devices 105, while allowing for customization to any of the platforms.

Each of the IoT devices 105 can connect to consumer electronics device 125, for example using pairing techniques in order to establish communication channels 101. As a result, the consumer electronic device 125 can employ device-to-device communications to directly control various functions of the IoT devices 105. For example, the consumer electronics device 125 can communicate on/off commands triggering either a turn-on or shut-off action for light 105e. Moreover, the consumer electronic device 125 has the capability to use cross-platform communication for device control. As an example, the consumer electronic device 125 can communicate multiple commands to control multiple IoT devices 105 using different computing platforms (e.g., different manufacturers). Yet another capability of the consumer electronic device 125 involves event driven rules. A device-operation rules engine (shown in FIG. 2) is an aspect of the embedded connectivity management software 110. The device-operation rules engine implements event driven rules, in which an identified event can trigger one or more actions in response. For example, a rule can be defined, and subsequently implemented by the embedded connectivity management software 110, which conditionally corresponds to a specific event, such as a motion detector detecting motion at a location inside of the home, to trigger one or more responsive actions, for instance blinking the lights and playing an alarm sound on speakers. Also, rules implemented by the device-operation rules engine can include triggers and/or actions from the API. For example, a service provider can use the API to trigger a rule (e.g., based on an electronic program guide, etc.) that then effects changes on the IoT devices 105 in the home.

The consumer electronic device 125 can be a resource constrained device with network connectivity, such as a gateway device, network attached storage (NAS) device, wireless router, set-top-box, home automation controller, and the like. Consumer electronic devices 105 of this type can be associated with various limitations as compared to larger scale and more sophisticated computer devices, including low RAM, low Flash RAM capacity, low power CPUs, with low clock cycles, and small operating systems. However, as discussed in greater detail in reference to FIG. 2, the embedded connectivity management software 110 implements a program architecture that is optimized for such devices. According to the disclosed techniques, the embedded connectivity management software 110 provides multiple solutions related to IoT connectivity and resource constrained devices, such as memory optimization, processing/CPU efficiency, a small daemon footprint, and a rules engine, supporting user-definable and editable rules, designed to be embedded in resource constrained devices.

Figure 2:
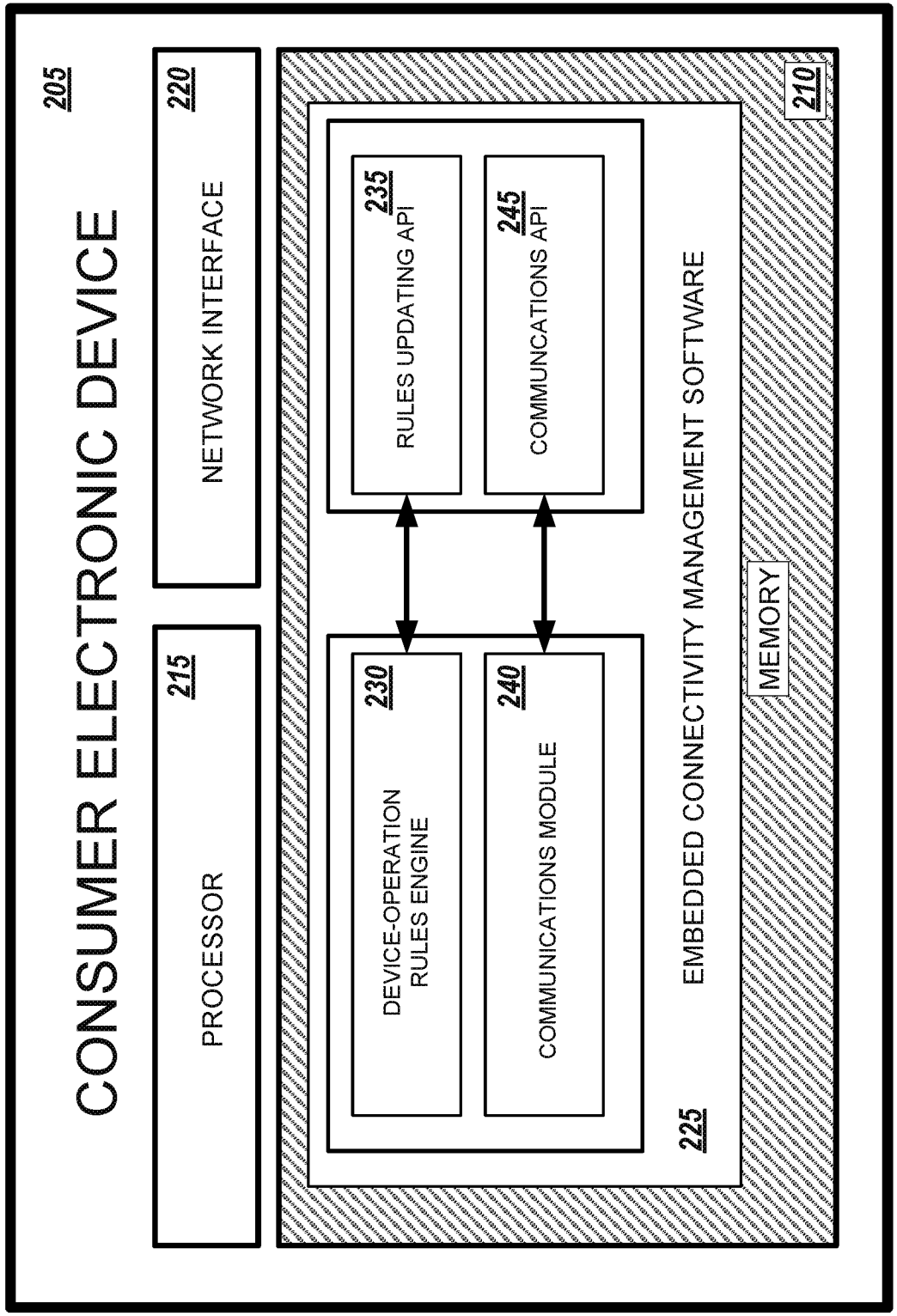
FIG. 2 shows an example of a consumer electronic device including a software architecture for implementing Internet of Things (IoT) connectivity management and a reconfigurable embedded rules engine.

FIG. 2 shows an example of a consumer electronic device 205 including a software architecture for implementing Internet of Things (IoT) connectivity management and a reconfigurable embedded rules engine. As illustrated in FIG. 2, the consumer electronic device 205 includes a memory 210 for storing program code, and processor 215. The processor 215 can be a microcontroller for executing the program code and processing the data. The memory 210 can be implemented as volatile memory such as random access memory (RAM), which erases data when powered off, can have fast read/write speeds, and can be used for storing program memory during runtime. Alternative, or in addition, memory 210 can be implemented as non-volatile memory such as read only memory (ROM), which is persistent storage that does not erase data when powered off, and can be used for storing the device firmware and/or boot code. Moreover, the memory 210 may be integrated within the processor 215, which can be a low power microcontroller, or coupled to the processor 215 via a bus or communication fabric. As discussed, the embedded connectivity management software 110 can be embedded code in some implementations; embedding code can impose limitations on the memory architecture. For example, embedded code can be restricted to the memory resources provided in the hardware design (as compared to higher-level applications that can request more memory or disk space, as needed).

A network interface 220 is shown, which can be a wide area network (WAN) interface and antenna coupled thereto. Alternatively, or additionally, the network interface 220 can be a local network interface, for example a WiFi interface (and WiFi antenna), or Ethernet interface for establishing a local area network communication channel.

As illustrated in FIG. 2, the embedded connectivity management software 225 is embedded software, or program code, having a program architecture that includes multiple modular components. Embedded software is specialized programming in a chip or on firmware to control functions of a device. Embedded software can be used to control the functions of various hardware devices and systems, similar to the manner in which a computer's operating system controls the function of software applications.

The modular and scalable design of the embedded connectivity management software 225 can support its ease of integration into resource constrained devices, such as consumer electronic device 205. The embedded connectivity management software 225 can be built upon the framework of existing IoT technology, such as the IoT Constrained implementation. The IoT Constrained implementation is an open source implementation of the OCF standard for IoT. In some implementations, the embedded connectivity management software 225 is specific to the CPU/Operating System (OS) combination used for a particular consumer electronic device.

The embedded connectivity management software 225 can be implemented as application layer software that is designed to operate as embedded software. For example, a software application can be installed on the consumer electronic device 205 (e.g., storing on hard disk drive (HDD), Flash memory, solid-state device (SDD)), where the software application is configured to embed and run the embedded connectivity management software 225 automatically. The architecture of the embedded connectivity management software 225 includes well defined APIs between the layers. An API is an application programming interface that defines a set of routines, protocols and tools for creating an application. An API defines the high level interface of the behavior and capabilities of the component and its inputs and outputs. An API can be designed as generic and implementation independent, allowing for the API to be used in multiple applications with changes only to the implementation of the API and not the general interface or behavior.

Accordingly, the embedded connectivity management software 225 can be installed into the OS of the consumer electronic device 205 in order to build the firmware image. Although discussed as application layer software, it should be appreciated that the embedded connectivity management software 225 can be implemented in other forms, such as middleware, and firmware. In some instances, various design tradeoffs can be considered in determining the appropriate software layer for implementing the embedded connectivity management software 225. Firmware can be suitable, for instance, in scenarios when improved performance (e.g., fast access speeds associated with ROM) is important to the software design.

FIG. 2 shows the embedded connectivity management software 225 as incorporating multiple components, including: communications module 240, which implements cross-platform network communications functionality using the network interface 220; communications API 245, which provides access to the cross-platform network communications functionality; device-operation rules engine 230, which triggers network communications in accordance with encoded rules and using the communications API 245 of the communications module 240; and rules updating API 235, which allows changes to the encoded rules. The device-operation rules engine 230, and the rules, can be abstracted from the communications module 240. For instance, the device-operation rules engine 230 can make use of an object model for its ability to monitor and change the state of devices (e.g., OCF object model), and can rely on the communications module 240 for the actual communication with the devices. The object model used by the communications module 240 can be different (as in the case with the protocol bridges), but then can require a software bridge to translate between the two models. Because the device-operation rules engine 230 uses APIs to communicate with the communications module 240, it can be implemented with a different communications module.

A small footprint is often a design consideration for embedded software development. The device-operation rules engine 230, as part of the software architecture, is embedded in resource constrained devices. Accordingly, the device-operation rules engine 230 can be optimally designed in order to achieve a small footprint, which in turn, requires less consumption of memory and processing resources, when embedded in consumer electronic device. As an example, the device-operation rules engine 230 can be optimized to meet the following specifications: less than 400 MHz Advanced RISC Machine (ARM) CPU, less than 2 MB of RAM, approximately 2 CPU threads, and less than 400 kB in ROM. The architecture of the connectivity management software 225 is discussed as it relates to resource constrained devices. However, the architecture can be designed to have optimal resource utilization on systems and/or devices of various sizes. For example, a baseline of memory and CPU thread usage can be established in accordance with the specification discussed above. Nonetheless, the design can be adapted to be better suited for the capabilities of larger device, such as increasing the above-mentioned baseline for more resource rich systems. Flexibility of the design can be accomplish because the software architecture can be customized specific to the intended platform.

The device-operation rules engine 230, through use of the rules updating API 235 permits updates to be remotely generated and applied to the engine's encoded rules. Thus, the device-operation rules engine 230 can be remotely defined, edited, or otherwise updated by a user, and received via the rules updating API 235. Moreover, the rules updating API 235 supports the ability to change the encoded rules in a manner that precludes rebooting or restarting the software to load any changes. For instance, rules are only read when a trigger event occurs. Then, when a rule is activated (or created as active) then the trigger is registered with the event handler. Even further, when a rule is deactivated (or deleted) the trigger is deregistered. Registration and deregistration actions do not require a reboot, and as a consequence, the updates to the device-operation rules engine 230 can be performed without rebooting the device. In some cases, changes to the device-operation rules engine 230 are automatically generated by a remote device (e.g., automated rule generation from cloud service).

The device-operation rules engine 230 includes a minimized code base, which is minimized to reduce the footprint of the engine in RAM, ROM, or both. The code base can be minimized through use of various techniques. As background, embedded rules can be generally described as consisting of three components, including: trigger; conditions; actions. The trigger is text, which is stored in a simple binary format that yields a binary comparison result. As referred to herein, simple text relates to text that is not a full scripting language, but more like a natural language statement. An example format of a trigger is shown below:
  if(motion is sensed) OR if(is light status on)

Both triggers evaluate to a comparison result (e.g., TRUE or FALSE). Based on this format, a trigger is a simple binary check, which contributes to the small footprint, as well as simplicity and speed. As a further example, a device can report its properties, and the trigger component executes as a binary check against a state of the one of the reported properties. In some cases, when two rules would be triggered at the same time the order these are processed is not defined (random). Another rule component, conditions, are evaluated in manner that is similar to triggers, except as an AND group. An example format for a condition is shown below:
  if((time is after 8 pm) AND (light is on) AND (nobody is home))

Accordingly, conditions are also binary comparisons, and must evaluate to true for the actions to be executed. Conditions are primarily device properties, but can relate to other information, such as time, date, etc., which also provide for binary checks.

Actions are simple statements that set a device property. An example of an action format is shown below:
  (set thermostat set point to 72°), (set light power to ON)

As a result, the code base can be generally characterized as consisting of rules including small sized text components (e.g., stored in binary text format) as discussed in detail above. It then follows, that the code base, that is comprised of simple binary text is also small, resulting in a small footprint. Moreover, rules and the respective components can be efficiently parsed, because the rules are evaluated with simple binary comparisons. Consequently, through the use of simple evaluations and formatting, the rules engine can be implemented as a "lightweight" engine, as compared to other engines with greater programming complexity, for instance javascript engines.

Importing functions that have been identified as required, rather than importing entire rule libraries can be used to achieve a minimal code base. In some cases, determining which functions are required by the engine is a compile-time decision, and can be based, at least in part, on various device-specific parameters. For instance, the code can be searched for functions in a given library, and only functions that are called are imported. Thereby, eliminating functions that have a lower (or no) probability of use. Moreover, the functions themselves can be optimized. Functions can be evaluated to determine the most efficient function to use for a given task. In this case, different approaches for accomplishing a task (e.g., which functions to use) can be compared to select the functions used. These techniques are examples, and other mechanisms for yielding the most efficient code base for the engines and software can be used as deemed necessary or appropriate.

Although the device-operation rules engine 230 is designed for scalability, various techniques can be implemented to ensure that the device-operation rules engine 230, minimally impacts device resources and/or is not scaled beyond resource constraints of the device. Defining and editing the encoded rules though the rules updating API 235 can be stateless, and further can be accomplished using a single call. Due to this stateless implementation of the rules updating API 235, rule updates consist of self-contained requests that are dependent on data that is locally stored, and acts to safeguard rules changes from negatively impacting constrained resources. For example, adding a new rule to the rules engine potentially has essentially no impact (or no impact) on the small memory footprint of the software, as the event processor only requires locally storing a portion of a rule (e.g., registering a trigger), which requires a small amount a memory (which may already be allocated to accommodate new rules being added).

In addition, the device-operation rules engine 230 can be programmed to check whether changes to the encoded rules involve adding new rules that can reconfigure the device-operation rules engine 230 in a manner that exceeds a constraint-related threshold. The system can define thresholds that are associated with various resource constraints, for instance limitations regarding the processor 215 or the memory 210. As an example, exceeding a threshold signifies that rule changes can potentially violate a resource constraint requirement, for example requiring more than 2 MB of RAM. Otherwise, the threshold is not exceeded, which indicates that the rule changes satisfy the resource constraint requirements. Accordingly, the device-operation rules engine 230 can use the memory 210 when the threshold is not exceeded, and use a remote memory device when the threshold is exceeded. In some cases, allocating more local memory, if available, can be performed if the threshold is exceeded. Furthermore, in an implementation, the system can be preconfigured with parameters indicating a predetermined resource utilization. Thus, the system can also make a determination whether a change in the utilized resources is in line with the predetermined resource utilization and, if so, push such a change to each of the devices.

In some implementations, optimization techniques involves active memory management. In an example of memory management, the system can dynamically determine whether each memory event uses the minimal amount of memory. Also, memory management aspects use string pooling and static memory (e.g., no dynamic allocations). Additionally, memory management techniques can include explicitly allocating memory, and immediately freeing memory after use. Optimization can involve other mechanisms that endeavor to improve the use and efficiency of volatile memory, such as RAM and/or non-volatile memory, such as ROM.

Figure 3:
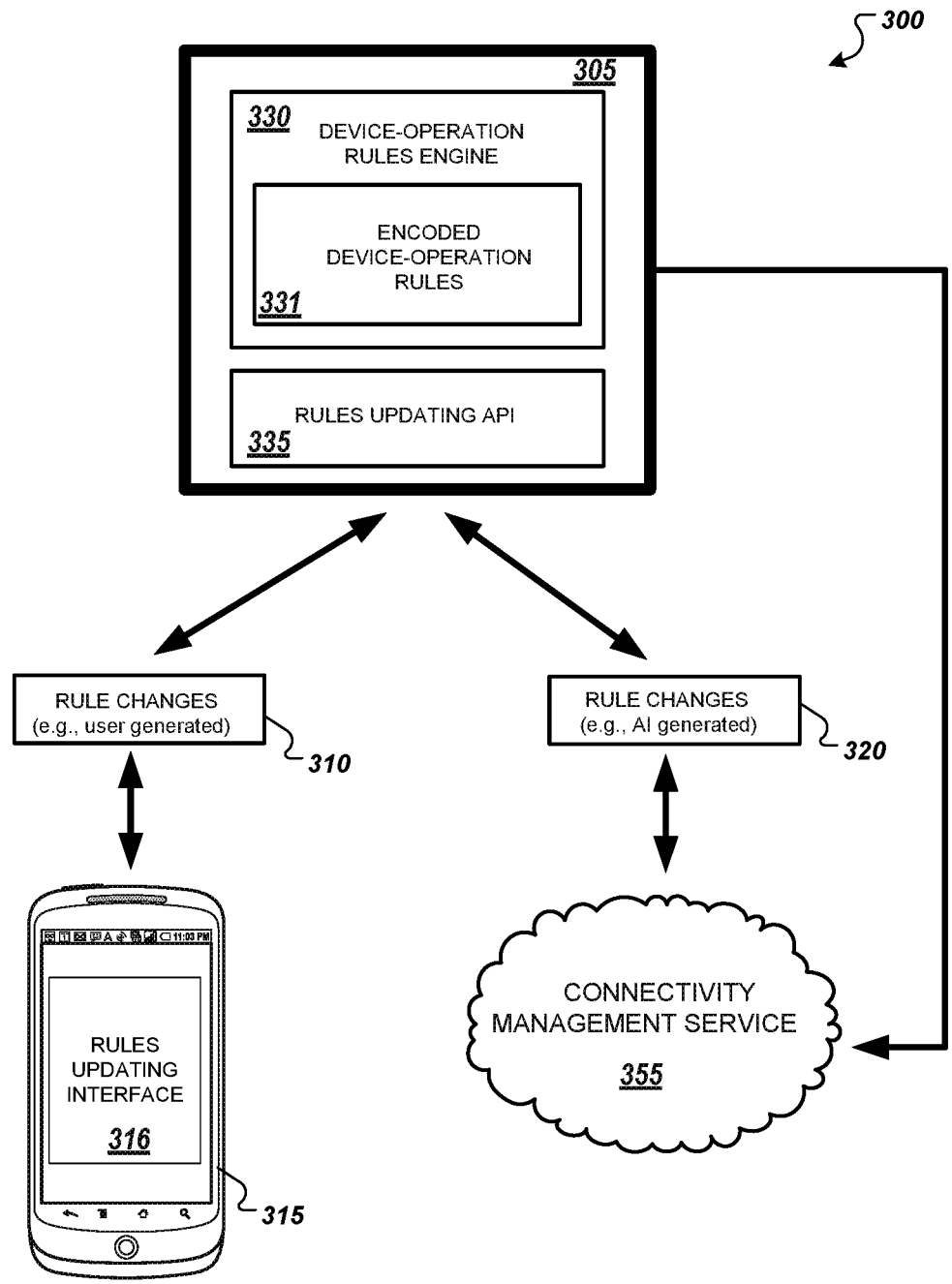
FIG. 3 shows an example of a communication system for implementing aspects of the software architecture in FIG. 2 relating to a device-operation rules engine including a rules updating application program interface (API).

FIG. 3 shows an example of a communication system 300 for implementing aspects of the software architecture relating to the device-operation rules engine 330 including a rules updating API 335. The device-operation rules engine 330 can be a flexible and user-configurable engine, that allows for rules to be remotely generated and subsequently applied to the embedded software. As a general description of the overall system 300, FIG. 3 illustrates a consumer electronic device 305, as it receives rules changes 310,320 from remote sources. In one case, the remote source is a mobile device 315 communicating rule changes 310 that have been defined by a user, in order to be received by the rules updating API 335. For instance, a user of the mobile device 315 can employ a rules updating interface 316 to enter selectable input used to generate rule changes 310. The rule changes 310 can include various modifications to one or more existing rules (e.g., delete) or generation of one or more newly defined rules.

In the other case, the remote source is shown as a connectivity management service 355 (e.g., cloud service). The connectivity management service 355 can automatically generate rule changes 320, for example through automation or artificial intelligence (AI) software (e.g., no direct end user input). Automatically generated rule changes 320 can result from the collection of usage data by the consumer electronic device 305, which is forwarded to the connectivity management service 355 and stored, for example as logged data. The rules updating API 335 can be designed to allow for analysis of the usage data, by computing resources associated with the service (e.g., servers, cloud computing), to generate updated rules 320. In some cases, usage data from multiple consumer electronic devices that can be associated with multiple different users (e.g., multiple homes) can be collected by the connectivity management service 335 and used to generate the rule changes 320. AI or automation software can combine the collected data, and generate rule changes 320 based, at least in part, on multiple factors related to the rules and devices. The factors considered during automatic rule generation can include, but are not limited to: device type; grouping location of devices; geographic location of the home; etc. In some implementations, rules for similar configurations are identified, and the new rules can then be inferred and created. After the rule updates 320 have been automatically generated, the rule updates 320 can be automatically pushed to the device-operation rules engine 330 embedded in the consumer electronic device 305.

Additionally, FIG. 3 illustrates encoded device-operation rules 331. The encoded rules can be implemented as text having a simple binary format. Encoded device-operation rules 331 can be implemented in accordance with various character encoding schemes, such as American Standard Code for Information Interchange (ASCII), Unicode, and the like. In some cases, the encoded device-operation rules 331 are implemented in accordance with more complex encoding schemes, such as Extensible Markup Language (XML). The encoded device-operation rules 331 can have an associated name and an identifier. In some cases, the encoded device-operation rules 331 are implemented using a data structure having a size approximately 1 kilobyte.

Also, as previously discussed, encoded device-operation rules 331 can include multiple components, namely trigger, condition, and action. A rule can be triggered by an event, having multiple conditions, and when all of the conditions are met, a number of actions can be executed. The event can be an event received from the OCF network through a sensor (e.g., temperature change, motion sensor triggered) or another state change at an OCF device (lamp switch on). In addition, a trigger can be time based (e.g., every morning at 8). The conditions reflect the current status of the system (e.g., 'nobody at home' or 'it is later than 8 pm') or status of device (e.g., 'lamp is switched on'). In the case when a rule is triggered by an event and all of the conditions are met, all actions are taken. Alternatively, if a single action fails, then all other actions will still be processed. Actions can be related to state changes of OCF devices (switch lamp on) but can also go beyond OCF (e.g., send email, send notification). In some cases, the encoded device-operation rules 331 are stored in a generic data file, which consists of zero or more rules. The syntax of the encoded device-operation rules 331 can be line based (e.g., each component is terminated by end of line or end of file). Empty lines or lines starting with specified characters (e.g., "#") in the encoded device-operation rules 331 can be ignored.

Notations can be used to represent the components of a rule, as discussed above. An example notation shown in the table below:

| Component | Notation | Example |
| --- | --- | --- |
| resource property | <UUID>[<path>].<property name> | 7b5b2b34-221b-4ebe-572e-390606fe197b/motion.value optional <path> is required if property name is not unique |
| system property | <property name> | nobodyathome weekday |
| assignment | <property name>(<new value>) | 7b5b2b34-521b-4ebe-572e-390606fe197b/ switch.value(on) nobodyathome(false) |
| system action | <action name> | scn_123456 send_message |
| timer specification | combined date and time representation in extended ISO 8601 format: YYYY-MM-DDThh:mm optional seconds no fractions of a second no timezone no week dates no ordinal dates any specifier could be an asterisk meaning 'every . . . ' | one point in time: 2017-07-17T07:30 once every day at 7:30 am: *-*-*T07:30 |

Additionally, a device can report its properties, where the trigger component executes a check against a state of the one of the reported properties. A table including examples of properties that can be reported in the system is shown below:

| System Property | Values | Remarks | Example |
|---|---|---|---|
| nobodyathome | true\|false | represents the status "nobody is at home" | nobodyathome eq true nobodyathome(false) |
| weekday | 0\|1\|2\|3\|4\|5\|6 (read-only) | represents the week day from 0 (Sunday) through 6 (Saturday) | in the week: weekday in 1 2 3 4 5 at weekend: weekday in 0 6 |
| currenttime | ISO 8601 format | represents the current date/time in ISO 8601 format | currenttime ge *-*-*T07:30 |

As discussed in detail above, editable device-operation rules engine 330 allows the user to define the conditions and actions for a rule. Actions can be related to the state changes of a device, and have a priority property that can automatically be assigned upon rule creation. Users can also change the order of actions through the rules updating interface 316, in some cases. A table including examples of actions that can be included in the system is shown below:

| System Action | Example |
|---|---|
| activate the scene with the given scene id | scn_123456 |
| send notification to all registered FCM clients | send_message |

Also, encoded device-operation rules 331 can have an external format. As an example, an external format of a rule can include: one rule identifier line starting with I; one rule name line starting with N; one rule event line starting with E; optional rule icon line starting with U; zero or more rule condition lines starting with C; and zero or more rule action lines starting with A. Furthermore, an example semi-formal syntax for the external format is shown below:

```
<rule> ::= <rule identifier line>
           <rule name line>
           <rule event line>
           <rule icon line>
           <rule condition line>*
           <rule action line>*
```

Further, an example of a rule in the external format is shown below:

```
# switch off the fan if the temperature sinks below 25 Celsius
I:4715
N:Stop cooling
E:7b5b2b34-321b-4ebe-572e-390606fe197b/temperature.temperature
C:7b5b2b34-321b-4ebe-572e-390606fe197b/temperature.temperature lt 25.0
A:7b5b2b34-021b-4ebe-572e-390606fe197b/switch.value(false)
```

In some cases, one or more of the encoded device-operation rules 331 can be associated with a name. A rule can be a user friendly name, such a plain meaning terms used by humans. An example of a semi-formal syntax for a rule name is shown below:

```
<rule name line>::='N:'<series of letters, digits or spaces, UTF-8 encoded>
```

As discussed above, a rule is triggered if an event occurs. This event comes either from a device or from the system. OCF-based events are described by the resource that is monitored. For example, a change of the current value (e.g., from a thermostat) can be checked in the condition. Timer events can be created by the device-operation rules engine 330 based on timer specification. An example of a semi-formal syntax for a rule event is shown below:

```
<rule event line> ::= 'E:' <event>
<event>           ::= <resource property>
                    | <system property>
                    | <timer specification>
```

In some instances, if a rule has been triggered by occurrence of an event, zero or more conditions are evaluated. If all conditions evaluate TRUE, the rule condition is TRUE. Alternatively, a comparison with data types that do not match evaluates FALSE (e.g., compare Boolean values and integer values). Examples of operators used in conditions are shown below:

| operator | Evaluates TRUE if . . . | Remarks |
|---|---|---|
| eq | <property> equals <comparison value> | valid for integer and Boolean |
| ne | <property> not equals <comparison value> | valid for integer and Boolean |
| le | <property> is lower or equal than <comparison value> | valid for integer |
| lt | <property> is lower than <comparison value> | valid for integer |
| ge | <property> is greater or equal than <comparison value> | valid for integer |
| gt | <property> is greater than <comparison value> | valid for integer |
| in | <property> is in the list of <comparison value> | valid for integer and list of integers |

An example of a semi-formal syntax for rule conditions is shown:

```
<rule condition line> ::= 'C:' <property> <operator> <comparison value>
<property>            ::= <resource property>
                        | <system property>
<operator>            ::= 'eq'
                        | 'ne'
                        | 'le'
                        | 'lt'
                        | 'ge'
                        | 'gt'
                        | 'in'
```

```
<comparison value>   ::= <integer or Boolean or space
                         separated integer list or timer specification
```

In scenarios where an event occurs and the conditions are TRUE, actions are executed immediately or delayed if a delay is specified. For OCF devices the action describes the property of the device to be modified and the new value to be set. If a device is already in the state that the action requires, we do not issue another call. An example of a semi-format syntax for rule actions is shown below:

```
<rule action line>   ::= 'A:' <action>
<action>             ::= <resource property> '(' <value> ')' [ ',' <delay in seconds> ]
                       | <system property> '(' <value> ')'
                       | <system action>
```

In some implementations, encoded device-operation rules 331 can be mapped from external format to a JavaScript Object Notation (JSON) format and vice versa. An example mapping of rules to a JSON format for rules is shown below:

```
I: is mapped to "id"
the optional flag disabled is mapped to "enabled": false
N: is mapped to "n"
U: is mapped to iconid
E: is mapped to "event", see description below
Each C: in mapped to a condition entry in "conditions" array,
   see description below
Each A: is mapped to an action entry in "actions" array,
   see description below
```

An example of a JSON object for rules is shown below:

```
{
"id": "4711",
"enabled": false,
"n": "Cool down",
"iconid": "ico123",
"event": EVENT,
"conditions": [
CONDITION,
CONDITION...
],
"actions": [
ACTION,
ACTION...
]
}
```

An example of a JSON object for an EVENT is shown below:

```
Omitting "di" means "system" or "engine", i.e. timer event.
The API /list_trigger provides a list of potential trigger for each "di". One trigger of that list
must be used here as "trigger".
If the trigger is not unique (e.g., the device a binary switch with property "value," and a sensor
with property "value"), "rt" and "path" should be added.
{
"di": "7b5b2b34-321b-4ebe-572e-390606fe197b",
"n": "Temperature Sensor",
"rt" : "oic.r.temperature",
"path" : "/temperature",
"trigger": "temperature"
}
```

A timer event can have no "di" and use the ISO8601 syntax (e.g., trigger every day at 7:30). An example of a time event is shown below:

```
{
"trigger": "*-*-*T7:30"
}
```

Omitting "di" can indicate the "system" or "engine" (e.g., nobodyathome condition). The API/list_conditions can provide a list of potential conditions (including data type and value ranges if available) for each "di". One or more properties of that list can be used here as "property" in "condition" list. In instances where the condition is not unique, "rt" and "path" should be added as well.

```
{
"di": "7b5b2b34-021b-4ebe-572e-390606fe197b",
"n": "Temperature Sensor",
"condition": [{
"path": "/temperature",
"property": "temperature",
"operator": "eq",
"value": "25.0"
}]
}
```

Omitting "di" means "system" or "engine", i.e. send_message action. "value" is optional, if no parameters are required, "delay" is optional if. The API/list_actions provides a list of potential properties (including data type and value ranges if available) for each "di". One or more properties of that list must be used here as "property" in "action" list. If the action not unique, "rt" and "path" should be added as well. An example of JSON object for ACTION is shown below:

```
{
  "di": "7b5b2b34-021b-4ebe-572e-390606fe197b",
  "n": "Temperature Sensor",
  "action": [{
    "path": "/switch",
    "property": "value",
    "value": false,
    "delay": 10
  }]
}
```

As an example, a rule can have the external format shown below:

```
I:4711 disabled
N:Stop cooling
E:7b5b2b34-321b-4ebe-572e-390606fe197b/temperature.temperature
C:nobodyathome eq false
C:7b5b2b34-321b-4ebe-572e-390606fe197b/temperature.temperature lt 25.0
C:7b5b2b34-021b-4ebe-572e-390606fe197b/alarmlight.value eq true
A:7b5b2b34-122c-4ebe-572e-390606fe197b/alarmlight.value(false),10
A:send_message
```

In continuing with the example, the abovementioned external format can be expressed as the example JSON object shown below:

```
{
  "id": "4711",
  "enabled": false,
  "n": "Stop cooling",
  "event": {
    "di": "7b5b2b34-321b-4ebe-572e-390606fe197b",
    "path": "/temperature",
    "trigger": "temperature"
  },
  "conditions": [
    {
      "condition": [{
        "property": "nobodyathome",
        "operator": "eq",
        "value": false
      }]
    },
    {
      "di": "7b5b2b34-321b-4ebe-572e-390606fe197b",
      "n": "Temperature Sensor",
      "condition": [{
        "path": "/temperature",
        "property": "temperature",
        "operator": "lt",
        "value": "25.0"
      }]
    },
    {
      "di": "7b5b2b34-122c-4ebe-572e-390606fe197b",
      "n": "Music Player",
      "condition": [{
        "path": "/temperature",
        "property": "value",
        "operator": "eq",
        "value": true
      }]
    }
  ],
  "actions": [
    {
      "di": "7b5b2b34-122c-4ebe-572e-390606fe197b",
      "n": "Music Player",
      "action": [{
        "path": "/player",
        "property": "playmode",
        "value": "1",
        "delay": 10
      }]
    },
    {
      "action": [{
        "property": "send_message"
      }]
    }
  ]
}
```

In referring to supported resource properties, the value of a property from a device can be referred using the format below:

<uuid>[<path>].<property name>,

An example of a resource property indicating the temperature of a temperature sensor is shown below:

7b5b2b34-321b-4ebe-572e-390606fe197b.temperature

Non read-only Properties can be set in actions expressed as functions. An example a non read-only property which changes the brightness of a lamp to 50% is shown below:

7b5b2b34-321b-4ebe-572e-390606fe197b.brightness(50)

In some cases, <path> can be added to <uuid>, to avoid ambiguity. Examples of this format are shown below:

7b5b2b34-721b-4ebe-572e-390606fe197b/motion.value

7b5b2b34-721b-4ebe-572e-390606fe197b/switch.value.

A table including examples of supported resource properties is shown below:

| Resource Type | Property | Property Type | Property Values |
|---|---|---|---|
| oic.r.switch.binary | value | boolean | true (on), false (off) |
| oic.r.temperature | temperature | number (read only) | |
| | units | string | C F K |
| oic.r.light.brightness | brightness | integer | 0 . . . 100 |
| oic.r.colour.chroma | hue | integer | 0 . . . 65535 |
| | saturation | integer | 0 . . . 100 |
| | csc | array of 2 numbers 0 . . . 1 | [0 . . . 1, 0 . . . 1] |
| | ct | integer | |
| oic.r.playmode | playmode | integer | 0 (off) 1 (music) 2 (alert) |
| oic.r.sensor.motion | value | boolean (read only) | true (sensed), false (not sensed) |
| oic.r.media | url | string | snapshot_URL video_URL |

The rules updating API 335 can create, modify, and delete encoded device-operation rules 331. A table including examples of API functions that can be provided by the device-operation rules engine 330 are shown below:

| Path | Method | Description |
| --- | --- | --- |
| /list_rules | GET | Returns the list of rules.<br>Each rule consists of an unique id (created and used by upcoming rule editor), a rule name ("n"), a trigger ("event"), optional conditions ("conditions") and actions ("actions").<br>Query parameter:<br>    none<br>HTTP Return codes:<br>200: ok (always)<br>Example:<br>/list<br>  [<br>    RULE...<br>  ] |
| /rules | POST | Create a new rule.<br>HTTP Return codes:<br>200 ok, the body contains the RULE including "id"<br>401 bad argument, e.g., syntax error in RULE<br>Example (body):<br>  RULE |
| /rules/<id> | POST | Update rule with id=<id><br>HTTP Return codes:<br>200 ok, the body contains the updated RULE<br>401 bad argument, e.g., syntax error in RULE<br>Example (body):<br>  RULE |
| /delete_rule | GET | Delete a rule.<br>Query parameter:<br>id - identifier of the rule<br>HTTP Return codes:<br>200: ok<br>402: invalid arguments<br>Example:<br>/delete_rule?id=4712<br>{<br>} |
| /list_trigger | GET | Returns list of available events from devices that could be used as trigger in a rule.<br>Query parameter:<br>    none<br>HTTP Return codes:<br>200: ok (always)<br>Example:<br>/list_trigger<br>  [<br>    {<br>      "di" : "7b5b2b34-721b-4ebe-572e-390606fe197b",<br>      "trigger": [ { "property" : "value", "rt" : "oic.r.sensor.<br>        motion", "path" : "/motion" },<br>        { "property" : "value", "rt" : "oic.r.switch.<br>        binary", "path" : "/switch" } ]<br>    },<br>    {<br>      "di" : "7b5b2b34-321b-4ebe-572e-390606fe197b",<br>      "trigger": [ { "property" : "temperature", "rt" : "oic.r.<br>        temperature", "path : "/temperature" } ]<br>    }<br>  ] |
| /list_conditions | GET | Returns list of available conditions that could be used as left part of a conditions in a rule.<br>Query parameter:<br>    none<br>HTTP Return codes:<br>200: ok (always)<br>Example:<br>/list_conditions<br>  [<br>    {<br>      "di" : "00a17a88-a01a-00ad-ea09-a390f0d0d0ea",<br>      "n" : "Bedroom Lamp",<br>      "condition": [ { "property" : "value", "type" : "boolean",<br>        "path" : "/light" },<br>        { "property" : "brightness", "type" : "int",<br>        "range" : [ 0, 100 ],<br>        "path" : "/light" } ]<br>    },<br>    {<br>      "condition": [ { "property" : "weekday", "type" : "int",<br>        "range" : [ 0, 6 ] }, |

-continued

| Path | Method | Description |
|---|---|---|
| | | { "property" : "nobodyathome", "type" : "boolean" } ]<br>}<br>]|
| list_actions | GET | Returns list of available actions that could be used as action in a rule.<br>Query parameter:<br>  none<br>HTTP Return codes:<br>200: ok (always)<br>Example:<br>/list_actions<br>  [<br>    {<br>      "di" : "00a17a88-a01a-00af-bad7-a8c0f0d0d0ea",<br>      "n" : "Bedroom Lamp",<br>      "action": [ { "property" : "value", "type" : "boolean", "path" : "/light" },<br>        { "property" : "brightness", "type" : "int",<br>          "range" : [ 0, 100 ], "path" : "/light" } ]<br>    },<br>    {<br>      "action": [ { "property" : "nobodyathome", "type" : "boolean" },<br>        { "property" : "sendmessage", "type" : "scene" },<br>        { "property" : "842b2ba784b9_wake_up", "type" : "scene" } ]<br>    }]|

Examples of functions implemented using the rules updating API 335 are shown below:

i. Motion Detected—Nobody Home

IF: Motion detected by LynxMiND Motion Sensor
WHILE: nobody is at home
THEN: send notification to Tim's phone

1. External format

I:4711
N:Motion detected - nobody home
E:7b5b2b34-221b-4ebe-572e-390606fe197b/motion.value
C:nobodyathome eq true
A:send_message ii. Motion Detected

IF: Motion detected by LynxMiND Motion Sensor
WHILE: somebody is at home
THEN: switch on LynxMiND Alarm Light, play alarm on LynxMiND Living Room Music Player, play alarm on LynxMiND Bed Room Music Player

1. External Format

I:4712
N:Motion detected
E:7b5b2b34-221b-4ebe-572e-390606fe197b/motion.value
C:nobodyathome eq false
A:7b5b2b34-521b-4ebe-572e-390606fe197b/alarmlight.value(true)
A:7b5b2b34-521b-4ebe-572e-390606fe197b/alarmlight.value(false),10
A:7b5b2b34-122b-4ebe-572e-390606fe197b/player.playmode(2)
A:7b5b2b34-122b-4ebe-572e-390606fe197b/player.playmode(0),10
A:7b5b2b34-122c-4ebe-572e-390606fe197b/player.playmode(2)
A:7b5b2b34-122c-4ebe-572e-390606fe197b/player.playmode(0),10 iii. Wake Up

IF: It is 7:30 a.m.
WHILE: it is a weekday
THEN: enable Wake up scene

1. External format

I:4713
N:Wake up
E:*-*-*T7:30
C:weekday in 1 2 3 4 5
A:scn_wake_up_123456 iv. Start Cooling

IF: Temperature is >=27° C.
WHILE: somebody is at home
THEN: turn on LynxMiND Fan

1. External format

I:4714
N:Start cooling
E:7b5b2b34-321b-4ebe-572e-390606fe197b/temperature.temperature
C:nobodyathome eq false
C:7b5b2b34-321b-4ebe-572e-390606fe197b/temperature.temperature ge 27.0
C:7b5b2b34-021b-4ebe-572e-390606fe197b/fan.value eq false
A:7b5b2b34-021b-4ebe-572e-390606fe197b/fan.value(true)

v. Stop Cooling

IF: Temperature is <25° C.
THEN: turn off LynxMiND Fan

1. External format

I:4715
N:Stop cooling
E:7b5b2b34-321b-4ebe-572e-390606fe197b/temperature.temperature
C:7b5b2b34-321b-4ebe-572e-390606fe197b/temperature.temperature lt 25.0

-continued

```
C:7b5b2b34-021b-4ebe-572e-390606fe197b/fan.value eq true
A:7b5b2b34-021b-4ebe-572e-390606fe197b/fan.value(false)
```

Although, examples of various of the encoded device-operation rules 331 are illustrated as being stored on the consumer electronic device 305, the encoded device-operation rules 331 can be stored on any accessible (e.g., mapped) storage device. Even further, the encoded device-operation rules 331 can be stored on various forms of memory or storage devices (e.g., HDD, Flash memory, SSD, mapped to cloud storage), and then read into volatile memory, such as RAM, upon startup.

Figure 4:
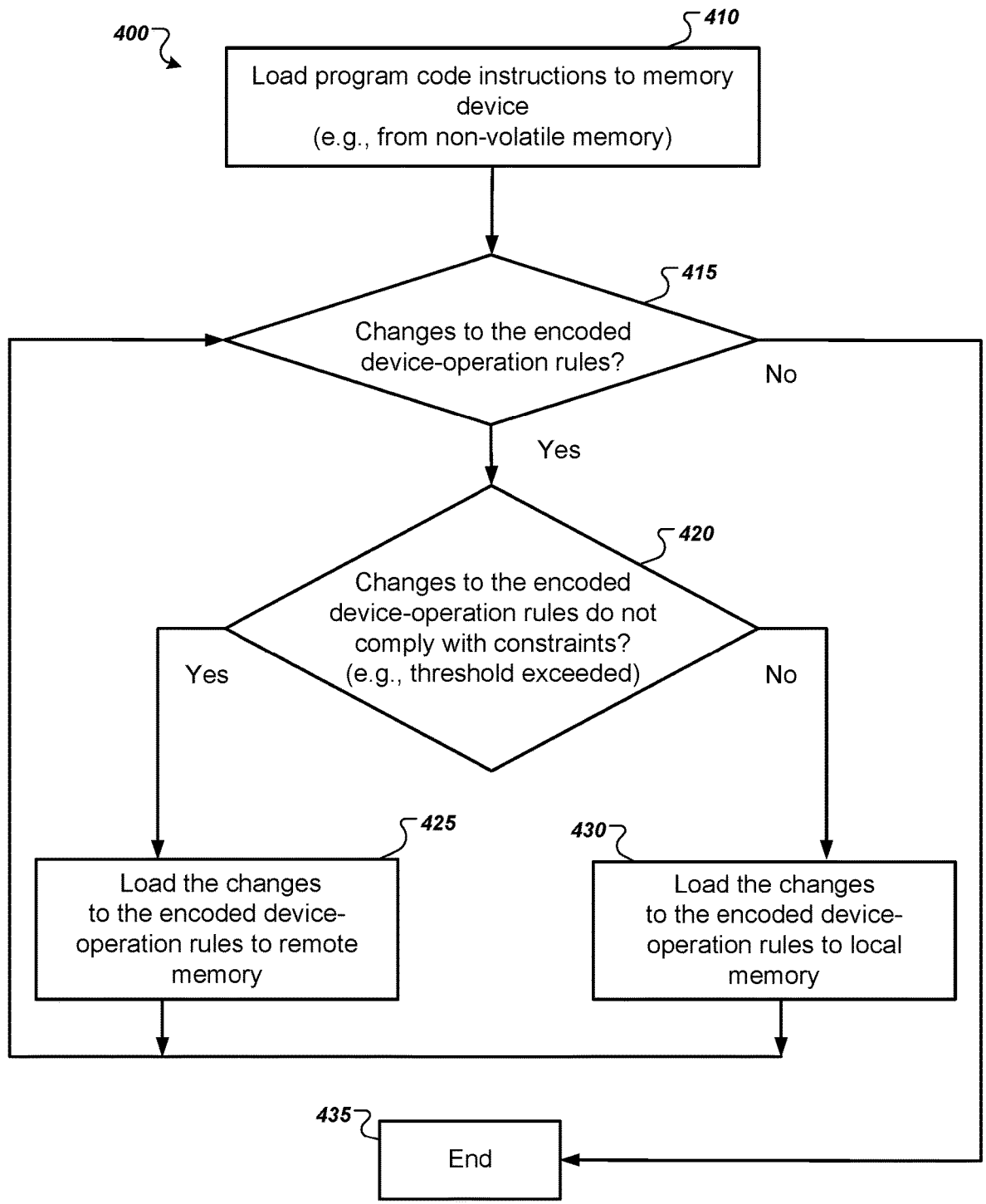
FIG. 4 shows an example of a process employed for configuring the consumer electronic device for Internet (IoT) connectivity management and a reconfigurable embedded rules engine.

FIG. 4 shows an example of a process 400 employed for configuring the consumer electronic device for Internet (IoT) connectivity management and a reconfigurable embedded rules engine. The process 400 can be generally described as involving the installation, or loading, of program code instructions related to embedded software, while actively considering the device's resource constraints. In some cases, the consumer electronic device includes program code that has been embedded into a non-volatile, non-transitory computer-readable, for example firmware stored in ROM. Accordingly, at block 410, the consumer electronic device can load Internet (IoT) connectivity management aspects of the program code instructions, from the non-volatile memory, into a volatile memory (e.g., RAM). The program code instructions can then execute from volatile memory, thereby configuring the device to perform the various IoT management operations specified by the program code instructions. In some cases, the program code instructions can be loaded, or installed in the local, volatile memory of the device from sources other than non-volatile memory. As an example, the program code instructions can be loaded from a computer program product, or pushed from a remote memory device (e.g., IoT connectivity service). The program code instructions can include a code base that has been minimized, in accordance with the techniques described in reference to FIG. 2, in order to reduce the memory footprint of the code base in non-volatile memory, volatile memory, or both. Additionally, the code base can implement the program architecture associated with the embedded connectivity management software as shown in FIG. 2.

The program architecture, as discussed in detail in reference to FIG. 2, includes a rules updating API that allows changes to the encoded device-operation rules. Thus, the device-operation rules engine can be reconfigured, based on rule changes received via the rules updating API. At block 415, a check is performed to determine whether changes to the encoded device-operation rules have been received. In the case where changes to the encoded rules have been received (e.g., Yes), the process 400 proceeds to block 420. Otherwise, it is determined that there are no changes to the encoded device-operation rules (e.g., reconfiguration of the device-operation rules engine to apply changes is not needed), and the process 400 can end at block 435 or return (periodically or continuously) to block 415 to actively identify changes to the encoded device-operation rules.

As noted, the consumer electronic device can have resource constraints associated with its processor and memory devices. Furthermore, reconfiguring the device-operation rules engine to include updates to the rules, potentially impacts these resources. Accordingly, the process 400 considers the device's resource constraints as parameters in a memory management scheme used to load rule changes, and reconfigure the device-operation rules engine. At block 420, the device-operation rules engine can be programmed to check whether the encoded device-operation rules comply (or do not comply) with the resource constraint(s). For example, the device-operation rules engine can be programmed to check whether changes include one or more newly generated rules to the encoded device-operation rules, and a check to determine whether adding these new rules to the encoded device-operation rules exceeds a threshold. One or more thresholds can be applied in the check at block 420, where the thresholds are associated with at least one of the processing resource constraints of the device. Based on this determination, a memory location can be selected for loading the changes to the encoded rules. The memory management scheme can be generally described as storing rule changes locally, when reconfiguring the engine does not potentially violate any resource constraints of the device. Otherwise, the rule changes are determined to require memory and/or processing capabilities that may be greater than the specifications of the consumer electronic device. In these cases, memory management can select to remotely store any changes to the encoded device-operation rules.

Accordingly, when the check 420 determines that the changes to the encoded device-operation rules do not comply with the constraints, in other words the threshold has been exceeded (e.g., Yes), then the process 400 moves to block 425. At block 425, the changes to the encoded device-operation rules can be stored by a remote memory device, such as remote computer associated with an IoT connectivity service or device acting as an IoT connectivity management hub. Then, the process 400 can return (periodically or continuously) to block 415 to actively identify changes to the encoded device-operation rules.

Otherwise, the check 420 has determined that the threshold has not been exceeded (e.g., No), or that the changes to the encoded device-operation rules do comply with the constraints. Subsequently, at block 430, changes to the encoded device-operation rules are loaded to a local, volatile memory device of the consumer electronic device, for example RAM. The changes to the encoded device-operation rules are loaded into a volatile memory device, in a manner that avoids a reboot of the consumer electronic device. The process 400 can then return (periodically or continuously) to block 415 to actively identify changes to the encoded device-operation rules. Accordingly, blocks 415-430 can be performed as an iterative sub-process, where multiple iterations of these steps are performed until there are no additional changes to the rules, and the process 400 can end at block 435.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., an LCD (liquid crystal display) device, an OLED (organic light emitting diode) display device, or another monitor device) for displaying information to the user and a keyboard and a pointing device (e.g., a mouse or a trackball) by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer program product, encoded on a computer-readable medium, operable to cause a hardware processor to perform operations comprising:
    loading program code instructions into a memory device to further cause the hardware processor to perform operations specified by the program code instructions, wherein the hardware processor and the memory device have associated processing resource constraints; and
    wherein the program code instructions comprise a code base that has been minimized to reduce a memory footprint of the code base in the memory device; and
    wherein the code base performs operations comprising
        effecting cross-platform network communications functionality using a computer communications network interface,
        providing access to the cross-platform network communications functionality through a communications application programming interface (API),
        triggering network communications, using the communications API, in accordance with encoded device-operation rules comprising at least one encoded communication triggering rule,
        allowing changes to the encoded device-operation rules through a rules updating API, and
        checking whether the changes to the encoded device-operation rules received through the rules updating API comply with at least one of the processing resource constraints associated with the hardware processor and the memory device.

2. The computer program product of claim 1, wherein the memory device is a volatile memory device, the memory footprint is a first memory footprint, and loading the program code instructions into a memory device comprises loading into the volatile memory device from a non-volatile, non-transitory computer-readable medium coupled to the volatile memory device to cause the hardware processor to perform the operations specified by the program code instructions, wherein the code base has been minimized to reduce a second memory footprint of the code base in the non-volatile, non-transitory computer-readable medium.

3. The computer program product of claim 2, wherein loading program code instructions into the volatile memory device includes loading the changes to the encoded device-operation rules received through the rules updating API in a manner that avoids a reboot, wherein the rules updating API is configured to read a received rule when a trigger event occurs, and when the rule is activated, a trigger is registered with an event handler, and when the rule is deactivated, a trigger is deregistered.

4. The computer program product of claim 1, wherein the encoded device-operation rules have been encoded in a simple binary format that is a text based format.

5. The computer program product of claim 1, wherein the code base performs operations further comprising checking whether the changes to the encoded device-operation rules include adding one or more additional encoded device-operation rules that exceed a threshold associated with at least one of the processing resource constraints associated with the hardware processor and the memory device, using the memory device when the threshold is not exceeded, and using a remote memory device when the threshold is exceeded.

6. The computer program product of claim 1, wherein the cross-platform network communications functionality comprises communicatively connecting, via the computer communications network interface, a plurality of consumer electronic devices that are accessible on the network, the plurality of consumer electronic devices having associated processor resource constraints, memory resource constraints, or both.

7. The computer program product of claim 1, wherein the encoded device-operation rules include components including triggers, conditions, and actions, wherein an action related to a device from a set of managed Internet of Things (IoT) devices is executed when a rule from the encoded device-operation rules is triggered by an event including a condition that has been met.

8. The computer program product of claim 1, wherein allowing the changes through the rules updating API comprises receiving requests for rule updates comprising self-contained requests that are dependent on data that is locally stored.

9. The computer program product of claim 1, wherein the operations performed by the code base comprise receiving one or more additional changes to the encoded device-operation rules from a remote device that has automatically generated the one or more additional changes to the encoded device-operation rules and pushed the one or more additional changes to the encoded device-operation rules to the rules updating API, wherein the remote device automatically generates the one or more additional changes to the encoded device-operation rules based on analysis of usage data collected from multiple consumer electronic devices associated with multiple different users.

10. A consumer electronic device comprising:
a computer communications network interface;
a hardware processor and a memory device coupled with the computer communications network interface, wherein the hardware processor and the memory device have associated processing resource constraints; and
wherein the memory device is configured to load program code instructions to cause the hardware processor to perform operations specified by the program code instructions; and
wherein the program code instructions comprise a code base that has been minimized to reduce a memory footprint of the code base in the memory device; and
wherein the code base implements a program architecture comprising
a communications module that implements cross-platform network communications functionality using the computer communications network interface, the communications module including a communications application programming interface (API) to provide access to the cross-platform network communications functionality, and
a device-operation rules engine that triggers network communications, using the communications API of the communications module, in accordance with encoded device-operation rules that have been encoded in a simple binary format and comprising at least one encoded communication triggering rule, the device-operation rules engine including a rules updating API that allows changes to the encoded device-operation rules, and wherein the device-operation rules engine is programmed to check whether the changes to the encoded device-operation rules received through the rules updating API comply with at least one of the processing resource constraints associated with the hardware processor and the memory device.

11. The consumer electronic device of claim 10, wherein the memory device is a volatile memory device, the memory footprint is a first memory footprint, and the consumer electronic device comprises:
a non-volatile, non-transitory computer-readable medium coupled with the volatile memory device and configured to load the program code instructions into the volatile memory device to cause the hardware processor to perform the operations specified by the program code instructions, wherein the code base of the program code instructions has been minimized to reduce a second memory footprint of the code base in the non-volatile, non-transitory computer-readable medium.

12. The consumer electronic device of claim 11, wherein the non-volatile, non-transitory computer-readable medium is configured to load program code instructions into the volatile memory device including changes to the encoded device-operation rules received through the rules updating API in a manner that avoids a reboot of the consumer electronic device, wherein the rules updating API is configured to read a received rule when a trigger event occurs, and when the rule is activated, a trigger is registered with an event handler, and when the rule is deactivated, a trigger is deregistered.

13. The consumer electronic device of claim 10, wherein the simple binary format is a text based format.

14. The consumer electronic device of claim 10, wherein the device-operation rules engine is programmed to check whether the changes to the encoded device-operation rules include adding one or more additional encoded device-operation rules that exceed a threshold associated with at least one of the processing resource constraints associated with the hardware processor and the memory device, use the memory device when the threshold is not exceeded, and use a remote memory device when the threshold is exceeded, wherein access to the remote memory device is established through the computer communications network interface.

15. The consumer electronic device of claim 10, wherein the cross-platform network communications functionality comprises communicatively connecting, via the computer communications network interface, a plurality of other consumer electronic devices that are accessible on the network, the plurality of other consumer electronic devices having associated processor resource constraints, memory resource constraints, or both.

16. The consumer electronic device of claim 10, wherein the device-operation rules engine receives one or more additional changes to the encoded device-operation rules from a remote device that has automatically generated the one or more additional changes to the encoded device-operation rules and pushed the one or more additional changes to the encoded device-operation rules to the rules updating API, wherein the remote device automatically generates the one or more additional changes to the encoded device-operation rules based on analysis of usage data collected from multiple consumer electronic devices associated with multiple different users.

17. The consumer electronic device of claim 10, wherein the encoded device-operation rules include components including triggers, conditions, and actions, wherein an action related to a device from a set of managed Internet of Things (IoT) devices is executed when a rule from the encoded device-operation rules is triggered by an event including a condition that has been met.

18. The consumer electronic device of claim 10, wherein the rules updating API allows the changes by being configured to receive requests for rule updates comprising self-contained requests that are dependent on data that is locally stored.

* * * * *